United States Patent

Reid, Jr. et al.

[11] Patent Number: 5,227,108
[45] Date of Patent: Jul. 13, 1993

[54] METHOD OF FORMING DECORATIVE TRIM STRIPS

[75] Inventors: James Reid, Jr., Cleveland Heights, Ohio; James Townsend, Moore, S.C.

[73] Assignee: The Standard Products Company, Cleveland, Ohio

[21] Appl. No.: 806,041

[22] Filed: Dec. 12, 1991

[51] Int. Cl.$^5$ .............................................. B29C 45/16
[52] U.S. Cl. .................................. 264/148; 156/211; 264/145; 264/162; 264/266; 264/296; 428/31
[58] Field of Search ............... 264/145, 148, 162, 255, 264/265, 266, 296, 328.1, 250; 156/153, 244.18, 211; 428/31

[56] References Cited

U.S. PATENT DOCUMENTS

| | | | |
|---|---|---|---|
| 3,745,056 | 7/1973 | Jackson | 428/31 |
| 3,959,538 | 5/1976 | Loew | 156/211 |
| 4,174,986 | 11/1979 | Jannings | 156/211 |
| 4,376,748 | 3/1983 | van Erven | 264/255 |
| 4,579,755 | 4/1986 | Takada et al. | 428/31 |
| 4,619,847 | 10/1986 | Jackson | 428/31 |
| 4,778,550 | 10/1988 | Barton et al. | 264/328.1 |
| 4,911,873 | 3/1990 | Kuzuya et al. | 264/152 |
| 4,962,584 | 10/1990 | Matsuda et al. | 264/266 |
| 5,108,681 | 4/1992 | Cakmakci | 264/151 |

FOREIGN PATENT DOCUMENTS

| | | | |
|---|---|---|---|
| 0249592 | 12/1987 | European Pat. Off. | 264/266 |
| 2047213 | 3/1972 | Fed. Rep. of Germany | 156/211 |
| 62-99122 | 5/1987 | Japan | 264/266 |

*Primary Examiner*—Jay H. Woo
*Assistant Examiner*—Robert B. Davis

[57] ABSTRACT

A method of forming an elongated decorative trim strip of thermoplastic material with an end of the strip having a desired shape of non-constant cross-section in planes perpendicular to the longitudinal axis of the strip. An extruded length of thermoplastic material is first made of a length substantially equal to the desired length of the decorative trim strip with a first longitudinally extending surface of the length being a front show face and a second longitudinally extending surface opposite the first surface being a back mounting surface. At an end portion of the extruded length, material is removed inwardly from the second surface to create a cavity behind the first surface while leaving the show face generally undisturbed. Thereafter, the end portion of the extruded length with the cavity formed therein is enclosed in a mold chamber with an interior surface having the desired end shape and thermoplastic material is injected into the formed cavity to fill the cavity and force the show face of the enclosed end portion into engagement with the interior surface of the mold.

7 Claims, 2 Drawing Sheets

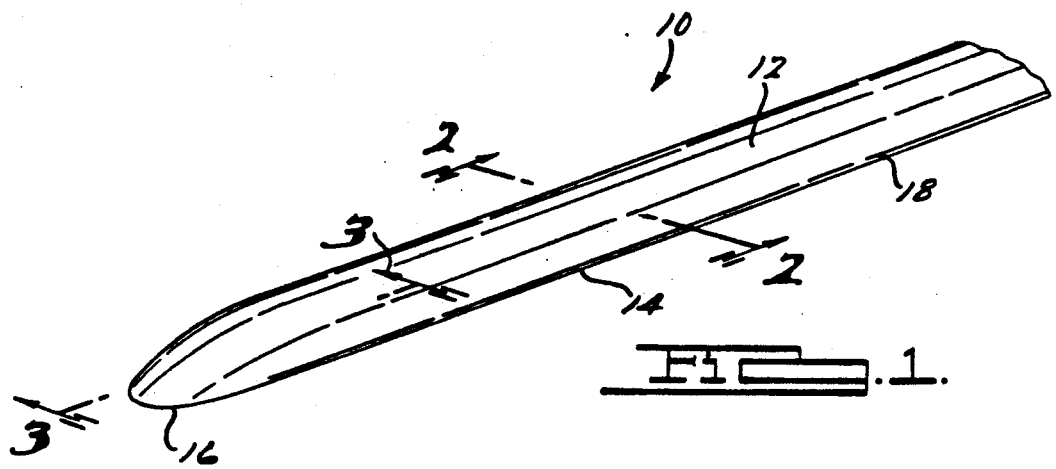
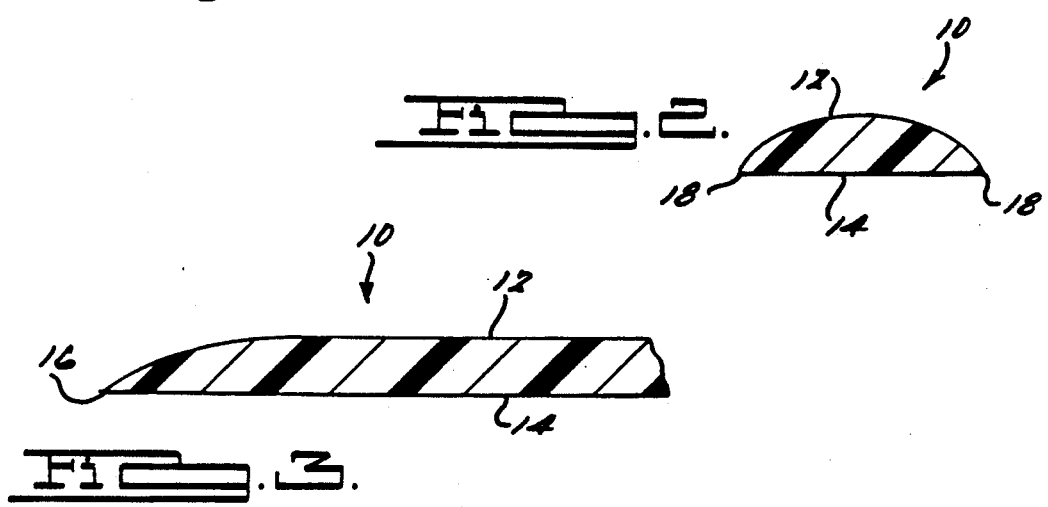
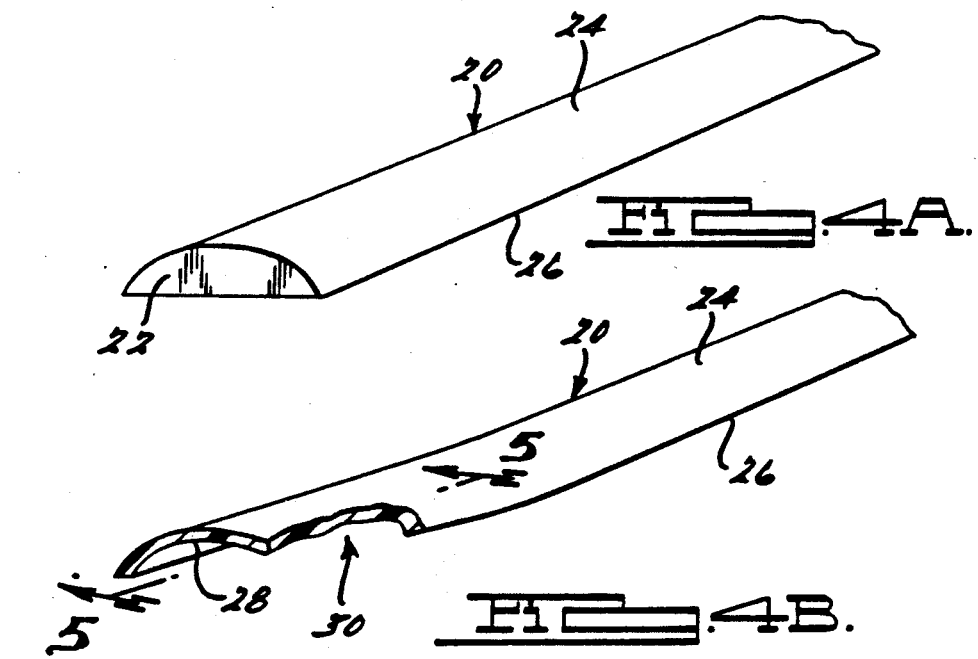

METHOD OF FORMING DECORATIVE TRIM STRIPS

BACKGROUND OF THE INVENTION

The subject invention is directed toward the art of forming products from thermoplastic materials and, more particularly, to a method of forming elongated, decorative trim strip products from thermoplastic extrusions.

The invention is particularly suited for forming decorative and protective trim strips of the type used on vehicle bodies and will be described with reference thereto; however, the invention is capable of broader application and could be used for forming products of a similar nature intended for other uses.

Trim strips applied as decorative and protective elements to the exterior surface of automotive body panels have been formed using a variety of different techniques. When such trim strips are formed from thermoplastic materials, both injection molding and extrusion processes have been used. Extrusion processing is capable of extremely high production rates with relatively low tooling costs as compared to injection molding. The extrusion process does present certain significant disadvantages, however. The most significant disadvantage is that the ends of the extruded strip element typically cannot have a smoothly tapering or contoured surface as is readily obtained with the injection molding process.

A variety of different approaches have been used in an attempt to provide contoured and shaped ends on extrusion formed thermoplastic strips. For example, separately molded end pieces have been bonded to the main extruded center section. When using this technique, a noticeable joint line generally results between the molded end sections and the extruded center section. Additionally, the color matching and appearance generally differs between the end sections and the center section. This is especially pronounced when the metal flake colorants have been used. The reason for this is that the appearance of a metal flake colorant results from the orientation of the flakes in the product surface. This cannot be controlled to provide a match between the extruded elements and the molded elements.

It has also been proposed to simply reheat the thermoplastic in the end area and reform the end shape. When using such reheat processes, however, discoloration of the end section results because of the elevated temperatures to which the plastic must be subjected.

BRIEF DESCRIPTION OF THE INVENTION

The subject invention overcomes the above-described problems and provides a method by which the ends of an extruded strip and element can be shaped and contoured to have a desired configuration without damaging the outer show surface of the trim strip without requiring a separate molded on or bonded end sections.

In accordance with the subject invention, the preferred method comprises providing an extruded length of thermoplastic material of a length substantially equal to the desired length of the resulting final decorative trim strip. The extruded length is generally of constant cross-section in planes perpendicular to its longitudinal axis with a first longitudinally extending surface of the length being a front show face and a second longitudinally extending surface on the side opposite the first face being a back mounting surface. At the end portion of the extruded length, material is removed inwardly from the second surface to create a cavity behind the first surface while leaving a thin wall between the show face and the bottom of the cavity. Thereafter, the end portion of the extruded length with the cavity formed therein is placed in a mold chamber having an interior surface with the desired end shape for the trim strip. With the extruded length in the mold, the thermoplastic material is injected into the cavity to fill the cavity and force the show face of the enclosed end portion into engagement with the surface of the mold and to bond the injected material to the wall surfaces of the cavity.

Preferably, and in accordance with a more limited aspect of the invention, the thermoplastic material injected into the cavity is heated sufficiently to cause it to bond to the walls of the cavity and to, in turn, cause it to be heated to a level to readily conform to the interior surface of the mold.

By the use of the subject method, it is not necessary to heat the end portion to a level such that damage to the colorant results. Likewise, there are no internal stresses remaining in the end portions. Within reason, the actual shape and contour provided on the end portion can vary widely, and the end portions on opposite ends of the same strip can be shaped differently as desired.

As can be seen from the foregoing, a primary object of the invention is the provision of a method of forming contoured ends on extruded plastic strips.

A further object is the provision of a method of forming contoured ends on extruded plastic strips by a combined material removal and injection molding operation.

Another object is the provision of a method of the type described which is simple to practice and which will produce a wide variety of end conformations.

BRIEF DESCRIPTION OF THE DRAWINGS

The above and other objects and advantages will become apparent from the following description when read in conjunction with the accompanying drawings wherein:

FIG. 1 is a pictorial view of an end section of a decorative trim strip of the type which can be formed using the subject invention;

FIG. 2 is a cross-sectional view taken on line 2—2 of FIG. 1; FIG. 3 is a cross-sectional view taken on line 3—3 of FIG. 1;

FIGS. 4A through 4E are views showing a preferred sequence of steps used in practicing the subject invention (FIGS. 4A through 4C are pictorial views and FIGS. 4D and 4E are longitudinal cross-sectional views); and, FIG. 5 is a cross-sectional view taken on line 5—5 of FIG. 4B.

DETAILED DESCRIPTION OF THE PREFERRED EMBODIMENT

Figure 4C:
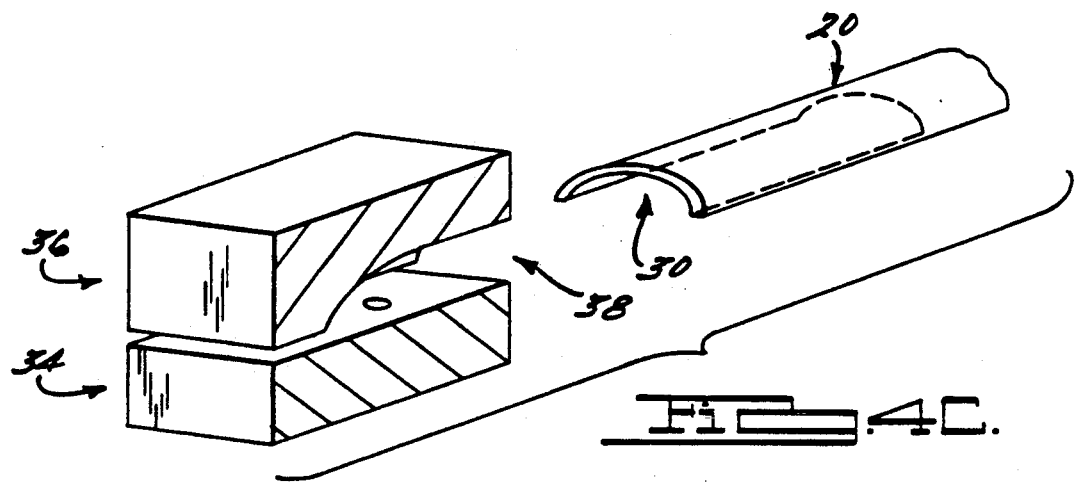

Referring more particularly to the drawings wherein the showings are the purpose of illustrating a preferred embodiment of the invention only and not for the purpose of limiting same, FIGS. 1 through 3 generally illustrate a typical thermoplastic trim strip of the general type which can be formed by the subject invention. The trim strip is identified generally with the reference numeral 1G and comprises an elongated main body of thermoplastic material which can, for example, have an upper show face surface 12 of generally convex configuration (best illustrated in FIG. 2). Opposite the show face 12 is a generally flat back surface 14 which serves as a mounting surface for the decorative strip 10. The left end of the strip 10 as viewed in FIG. 1 is preferably smoothly contoured and tapers downwardly to a relatively thin feather edge or end 16 which joins with similar thin tapered side edges 18. As previously mentioned, strips of the general type and configuration shown in FIGS. 1 through 3 have been formed using conventional injection molding techniques as well as by extruding a main center section and then applying a contoured end tip portion through a remolding operation or by bonding an injection molded end portion to an extruded center section. For the reasons previously discussed, these prior art approaches have been less than completely desirable.

According to the subject invention, a sequence of steps best shown in FIGS. 4A through 4E can be used to provide formed end sections on lengths of continuously extruded thermoplastic material having a desired constant cross-sectional shape in planes perpendicular to its longitudinal axis. Referring in particular to FIG. 4A, a typical length of extruded plastic having a cross-section corresponding to that previously discussed with reference to FIGS. 1 through 3 is shown in a pictorial view. As shown therein, the end of the strip 20 is merely transversely severed providing a cut end surface 22. As will become apparent as the description of the method proceeds, the actual cross-sectional shape of the strip 20 could vary widely depending upon the resulting desired configuration of the decorative strip to be formed. Likewise, the end cut 22 could be contoured or non-planar depending upon the actual final form shape desired. In any event, the face surface of the strip 20 is identified with the numeral 24 and the generally planar back end or mounting surface has been identified with the numeral 26.

Figure 5:
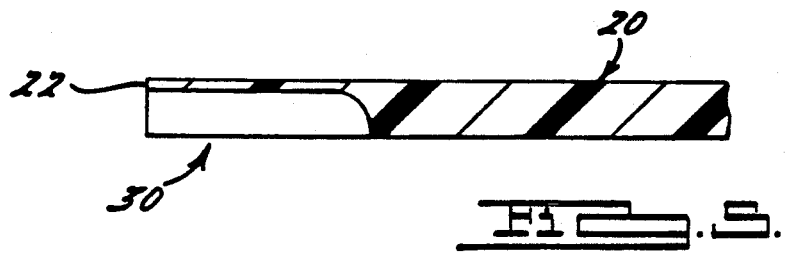

The length of the strip provided in FIG. 4A is preferably at least as great as the final length of formed trim strip desired. This length of extruded, constant cross-section thermoplastic strip is further processed in the general method sequence step shown in FIGS. 4B and 5. As shown therein, the end of the strip 20 is provided with a cavity which extends inwardly from the back face 26 of the strip to a position such that only a relatively thin wall 28 remains between the bottom of the cavity 30 and the exterior front or show face 24 of strip 20. The cavity can be formed by milling, routing, or any conventional cutting methods. Additionally, the cavity preferably extends from the end of the strip axially along the length to a position substantially corresponding to the length of the contoured end shape to be applied to the strip. As will be apparent from the description of the further processing of the strip, the cavity can have other variations and shapes compared to that shown; however, it should be noted that the cavity is preferably formed without cutting through or damaging the outer show face of strip 20. The actual resulting thickness between the bottom of the cavity and the show face can vary somewhat, but the thickness should be at least great enough to prevent the presence of the cavity from being readily detectable from the exterior face of the strip. Although it is desirably as thin as possible to facilitate the further forming as will become apparent.

In an alternate embodiment of the present invention, the strip can be formed via a co-extrusion of a show face layer over a base layer for forming the second surface. Preferably, for co-extrusion both the show face layer and base layer are the thermoplastics. As set forth above the cavity is formed in the base layer at an end portion which leaves the show surface layer in tact. Thereafter, the strip can be formed as set forth below.

Figure 4D:
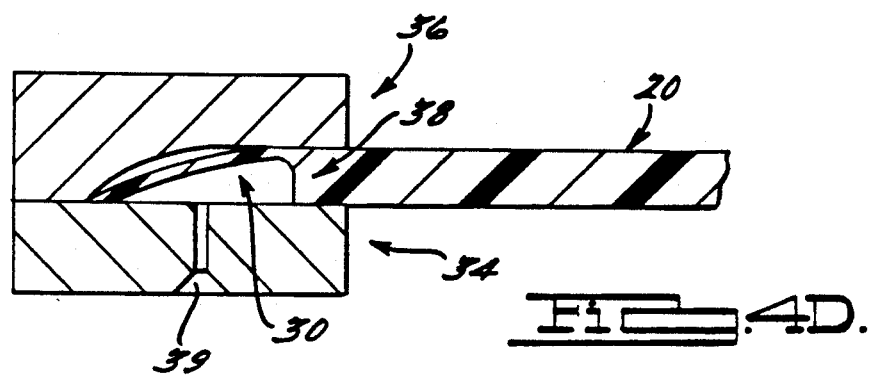
Figure 4E:
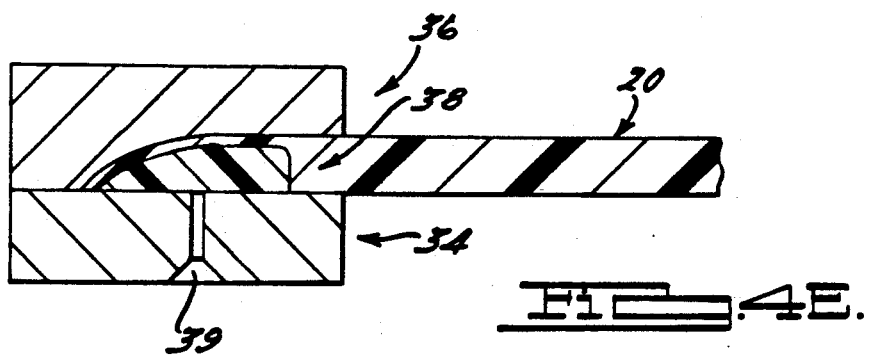

With the cavity 30 formed in the end portion of the strip as illustrated in FIG. 4B, the strip is further processed in the manner shown in FIGS. 4C through 4E. As best seen in FIG. 4C, injection molding dies are provided (illustrated somewhat diagrammatically in FIG. 4C). The two opposed die halves 34 and 36 are designed so that when clamped together and placed in mating opposed condition, they form a closed mold cavity 38 which is sized so as to closely and tightly receive the end of the strip 20 with the cavity formed therein. As illustrated in FIG. 4C, the two die halves 34, 36 preferably have an interior shape which is contoured to exactly duplicate the end shape desired on the strip 20 and to be such that, when the strip with the cavity therein is placed in position, the sprue opening 39 to the mold chamber 38 opens behind the cavity 30. Additionally, the entry end of the mold which engages the strip ho at a location axially spaced from the cavity section engages tightly and substantially seals the strip end in position. Additionally, although not illustrated, it is possible to design the mold halves 34, 36 such that they tightly engage about the end of the strip in the area of the cavity forming portion. This is generally illustrated in FIG. 4D, which is a side elevation in cross-section showing the die halves 34, 36 in position and engaged with the ends of the strip.

After being tightly engaged in position on the end of the length of strip, a thermoplastic material is injected into the mold into the cavity portion 30 to drive the show face of the strip 20 into engagement with the surface of mold half 36 and to completely fill the cavity with thermoplastic resin while bonding to the surface of the cavity 30.

Normally, the temperatures and pressure encountered in the injecting operation are sufficient so as to heat the wall of the cavity 30 sufficiently to allow it to, in effect, flow and conform readily to the surface of the mold half 36 without damaging the material. Alternatively, it is sometimes desirable to use a suitable solvent or the like to assure a good bond between the injected material and the wall surface of the bottom of cavity 30. In any event, after the injection takes place, the ends of the decorative strip 20 should have the configuration as dictated by the interior of the die halves 36, 34. Additionally, because the show face of the strip serves as the exterior surface for the contoured end, there is no mold line or bond joint line appearing on the show face of any of the strip.

Many different thermoplastics and combinations thereof can be used in the practice of the invention. For example, rigid and flexible PVC, thermoplastic rubbers, and urethanes have been used successfully. In practicing the invention with these plastics, injection molding temperatures and pressures in the ranges normally used for these plastics will generally cause proper formation and bonding with the strip end. However, a suitable solvent or bonding agent can be applied to the interior of cavity 30. Likewise, preheating of the strip to facilitate movement of the strip wall into engagement with the mold wall is a possible alternative.

Having thus described the invention, it is claimed:

1. A method of forming an elongated decorative trim trip of thermoplastic material with an end of the strip having a desired shape of non-constant cross-section in planes perpendicular to the longitudinal axis of the strip comprising the steps of:

provid ing an extruded length of thermoplastic material of a length substantially equal to the desired length of the decorative trim strip, said extruded length being of constant cross-section in planes perpendicular to its longitudinal axis with a first longitudinally extending surface of the length being a front show face and a second longitudinally extending surface opposite the first surface being a back mounting surface;

at an end portion of the extruded length removing material inwardly from the second surface to create a cavity behind the first surface while leaving the show face generally undisturbed;

enclosing the end portion of the extruded length with the cavity formed therein in a mold chamber with an interior surface having said desired end shape of non-constant cross-section for forcing the portions of said end material remaining after removal of the material toward engagement of a surface of the mold which is aligned with the back mounting surface; and with the extruded length in the mold injecting thermoplastic material into the cavity to fill the cavity and force the show face of the enclosed end portion into engagement with the surface of the mold whereby a single continuous show surface is formed in an area at the end contiguous with the back mounting surface.

2. The method as set forth in claim 1 wherein the thermoplastic material injected into the cavity is heated to a temperature sufficient to heat the enclosed en portion of the length to cause it to become sufficiently soft to readily conform to the interior surface of the mold.

3. The method as set forth in claim 1 wherein the cavity formed in the end portion of the length is formed to a depth such that only a thin and relatively uniform thickness of material remains between the bottom of the cavity and the first face of said length.

4. The method as set forth in claim 1 wherein said show face of the extruded length is constituted of a separate layer of thermoplastic material co-extruded over a base layer which forms the second surface of the extruded length, and wherein the cavity is formed by removing the base layer in an end portion of said extruded length.

5. A method of forming an elongated decorative trim strip of thermoplastic comprising the steps of:

extruding an elongated section of thermoplastic having a desired substantially constant cross-section throughout its longitudinal extend, the extruded elongated section having a back face intended for mounting to a support surface and a decorative show face on the side opposite the back face;

cutting the extruded elongated section to a length nearly equal to the length of the desired trim strip and removing material inwardly from the back face toward the show face adjacent each end of the length to provide a cavity behind the show face for a short end portion at each end of the length;

confining the end portions of the length with the cavities therein in a mold having a shape corresponding to a desired end shape for the decorative trim strip wherein the show face portion is forced toward a mold surface aligned with said back face; and, injecting thermoplastic material into the cavities behind the show face to cause the show faces to conform to an internal surface of the mold and assume the desire end shape whereby a single continuous sow face is formed at said end portion wherein all surfaces are contiguous with said back face.

6. The method as set forth in claim 5 wherein the extruded elongated section is cut nearly equal to the length of the desired trim strip prior to forming either of the cavities.

7. The method as set forth in claim 5 wherein the injecting step is carried out sequentially on each end of the length.

* * * * *

UNITED STATES PATENT AND TRADEMARK OFFICE
CERTIFICATE OF CORRECTION

PATENT NO. : 5,227,108
DATED : July 13, 1993
INVENTOR(S) : James Reid, Jr. et al It is certified that error appears in the above-indentified patent and that said Letters Patent is hereby corrected as shown below:

Column 2, line 68, "1G" should be --10--

Column 4, line 26, "ho" should be --20--

Column 5, line 3, claim 1, "trip" should be --strip--

Column 5, line 38, claim 2, "en" should be --end--

Column 6, line 14, claim 5, "extend," should be --extent--

Column 6, line 33, claim 5, "desire" should be --desired--

Column 6, line 34, claim 5, "sow" should be --show--

Signed and Sealed this

Twenty-second Day of November, 1994

*Attest:*

BRUCE LEHMAN

*Attesting Officer*  *Commissioner of Patents and Trademarks*